US011104425B2

(12) United States Patent
Euzet et al.

(10) Patent No.: US 11,104,425 B2
(45) Date of Patent: Aug. 31, 2021

(54) METHOD OF DRIVING AN AIRCRAFT UNDERCARRIAGE BETWEEN A DEPLOYED POSITION AND A RETRACTED POSITION

(71) Applicant: SAFRAN LANDING SYSTEMS, Velizy Villacoublay (FR)

(72) Inventors: Bertrand Euzet, Velizy-Villacoublay (FR); Marc Quenerch'Du, Velizy-Villacoublay (FR); Bertrand Dubacher, Velizy-Villacoublay (FR); Philippe Henrion, Velizy-Villacoublay (FR); Sebastien Dubois, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 364 days.

(21) Appl. No.: 16/354,555

(22) Filed: Mar. 15, 2019

(65) Prior Publication Data

US 2019/0283867 A1 Sep. 19, 2019

(30) Foreign Application Priority Data

Mar. 16, 2018 (FR) ...................................... 1852268
Jul. 19, 2018 (FR) ...................................... 1856723

(51) Int. Cl.
*B64C 25/20* (2006.01)
*B64C 25/34* (2006.01)
*B64C 25/26* (2006.01)

(52) U.S. Cl.
CPC .............. *B64C 25/20* (2013.01); *B64C 25/26* (2013.01); *B64C 25/34* (2013.01)

(58) Field of Classification Search
CPC .......... B64C 25/20; B64C 25/26; B64C 25/34
See application file for complete search history.

(56) References Cited

U.S. PATENT DOCUMENTS 5,269,481 A * 12/1993 Derrien .................. B64C 25/18
244/102 A
9,145,204 B2 * 9/2015 Ducos ..................... B64C 25/26
(Continued)

FOREIGN PATENT DOCUMENTS

FR 2 946 319 A1 12/2010
FR 3 022 886 A1 1/2016
JP 59-179498 A 10/1984

OTHER PUBLICATIONS

Search Report for corresponding FR 1852268, dated Nov. 5, 2018.
Search Report for corresponding FR 1856723, dated Jan. 15, 2019.

*Primary Examiner* — Philip J Bonzell
*Assistant Examiner* — Tye William Abell
(74) *Attorney, Agent, or Firm* — Sughrue Mion, PLLC

(57) ABSTRACT

The invention relates to a method of driving an aircraft undercarriage between a deployed position and a retracted position, the undercarriage comprising a leg (2) that is hinged to a structure of the aircraft in order to be movable between those two positions and being stabilized in the deployed position by means of a brace member (10) comprising two limbs (11, 12) that are hinged to each other, one of which is coupled to the leg and the other of which is coupled to the structure of the aircraft, the limbs being brought into an aligned position when the leg is in the deployed position. According to the invention, a rotary actuator (20) is arranged on the aircraft, which actuator comprises first and second cranks (22, 24) that are mounted to turn freely about a common axis of rotation but that have a relative angular position that can be controlled, and that are arranged to stabilize the limbs of the brace member in the substantially aligned position.

6 Claims, 8 Drawing Sheets

(56) References Cited

U.S. PATENT DOCUMENTS

2012/0080559 A1\* 4/2012 Keller ................... B64C 25/26
                                                        244/102 A
2017/0057625 A1\* 3/2017 Mellor ................... B64C 25/52

\* cited by examiner

METHOD OF DRIVING AN AIRCRAFT UNDERCARRIAGE BETWEEN A DEPLOYED POSITION AND A RETRACTED POSITION

The invention relates to a method of driving an aircraft undercarriage between a deployed position and a retracted position.

BACKGROUND OF THE INVENTION

Aircraft undercarriages are known that comprise a leg hinged to a structure of the aircraft so as to be movable between a deployed position and a retracted position. The leg is stabilized in the deployed position by means of a brace member that often comprises two limbs that are hinged together, one of the limbs being coupled to the leg and the other being coupled to the structure of the aircraft, the two limbs being held in a substantially aligned position by a stabilizer member that forms a lock that can be unlocked in order to enable the leg to be raised from the deployed position to the retracted position. For this purpose, such undercarriages generally include an unlocking actuator for unlocking the stabilizer member and for breaking the alignment of the brace member, and a drive actuator for raising the leg towards the retracted position.

Nevertheless, it is possible to use a single actuator that performs both functions. By way of example, Document FR 2 946 319 proposes using a drive actuator of rotary electromechanical type coupled to one of the arms of the member for stabilizing the brace in the aligned position, for the purposes both of driving the undercarriage and of unlocking the stabilizer member.

Keeping the leg in the retracted position generally requires the use of an uplock box secured to the structure of the aircraft and including a hook that engages a roller secured to the leg when the leg reaches the retracted position. Nevertheless, realignment solutions are known in which the two limbs of the brace member or the two limbs of the stabilizer member are in the aligned position when the undercarriage is in the retracted position, which makes it possible to omit the uplock box.

OBJECT OF THE INVENTION

The invention seeks to propose a method of driving an aircraft undercarriage between a deployed position and a retracted position that makes use of only a single actuator.

SUMMARY OF THE INVENTION

In order to achieve this object, there is provided a method of driving an aircraft undercarriage between a deployed position and a retracted position, the undercarriage having a leg hinged to a structure of the aircraft to be movable between the deployed position and the retracted position, being stabilized in the deployed position by means of a brace member comprising two limbs that are hinged to each other, one of the limbs being coupled to the leg and the other to the structure of the aircraft. According to the invention, a rotary actuator is arranged on the aircraft, the actuator having first and second cranks mounted to turn freely about a common axis of rotation but presenting a relative angular position that can be controlled, the first crank being connected to the brace member by a first connecting rod, while the second crank is connected to the leg by a second connecting rod, such that the cranks present:

a first relative angular position in which the first crank and the first connecting rod are brought into a first alignment when the leg is in the deployed position, thereby stabilizing the limbs of the brace member in a substantially aligned position; and a second relative angular position in which the second crank and the second connecting rod are brought into a second alignment while the leg is in the retracted position, thereby stabilizing the leg in the retracted position.

Such a provision associates the angular position of the leg relative to the structure of the aircraft in one-to-one correspondence with the relative angular position of the two cranks. In the invention, it is ensured that the deployed position of the leg corresponds to a first alignment of the first crank and of the first connecting rod, while the retracted position corresponds to a second alignment of the second crank and of the second connecting rod. The first alignment serves to stabilize the brace member in the aligned position, and thus to stabilize the leg in the deployed position, while the second alignment stabilizes the leg in the retracted position, thereby eliminating any need to have recourse to an uplock box.

A crank and the associated connecting rod are said herein to be "in alignment" when the two elements are in a position such that their mutual hinge axis, the hinge axis between the connecting rod and the undercarriage, and the axis of rotation of the crank are contained substantially in a single plane. Nevertheless, and as is well known, an alignment can be stabilized by going a little beyond the perfectly aligned position so as to take the two elements into a position that is very slightly out of alignment (i.e. an "over-centered" position) that is defined by abutments between said elements. These positions in abutment are held by the residual torque of the actuator when it is not powered (electromagnetic torque due to the permanent magnet for an electromagnetic actuator, or torque due to fluid held captive in the chambers of the actuator for a hydraulic actuator). This provision thus makes it possible to avoid any need for having recourse to an auxiliary locking member, since its function is replaced by each of the crank and connecting rod pairs being in alignment.

DESCRIPTION OF THE FIGURES

The invention can be better understood in the light of the following description of a particular embodiment of the invention given with reference to the figures in the accompanying drawings, in which.

DETAILED DESCRIPTION OF THE INVENTION

Figure 1:
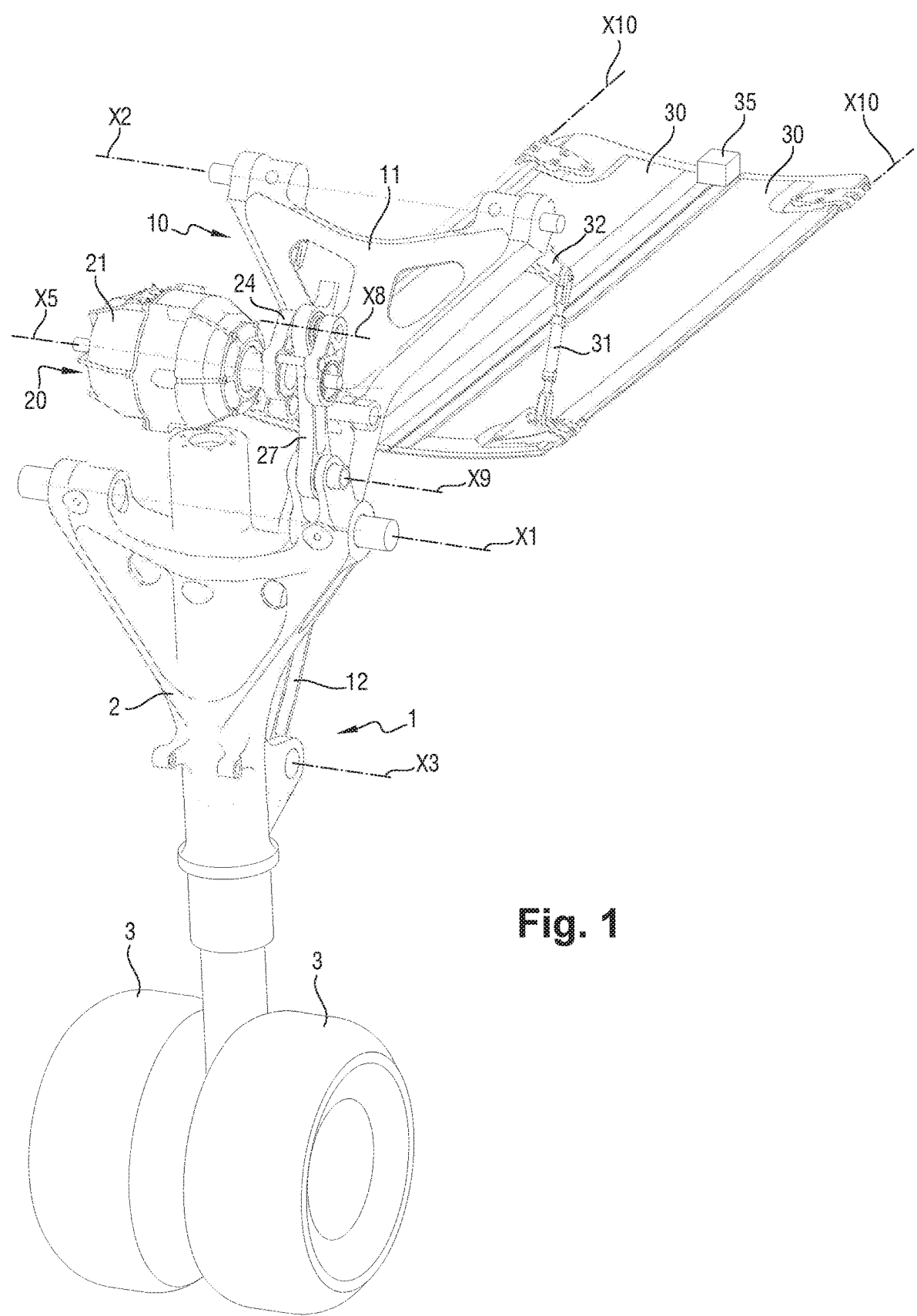
FIGS. 1 and 2 are perspective views of an undercarriage fitted in accordance with the invention with an actuator having two cranks, the undercarriage being shown respectively in its deployed position and in its retracted position.
Figure 2:
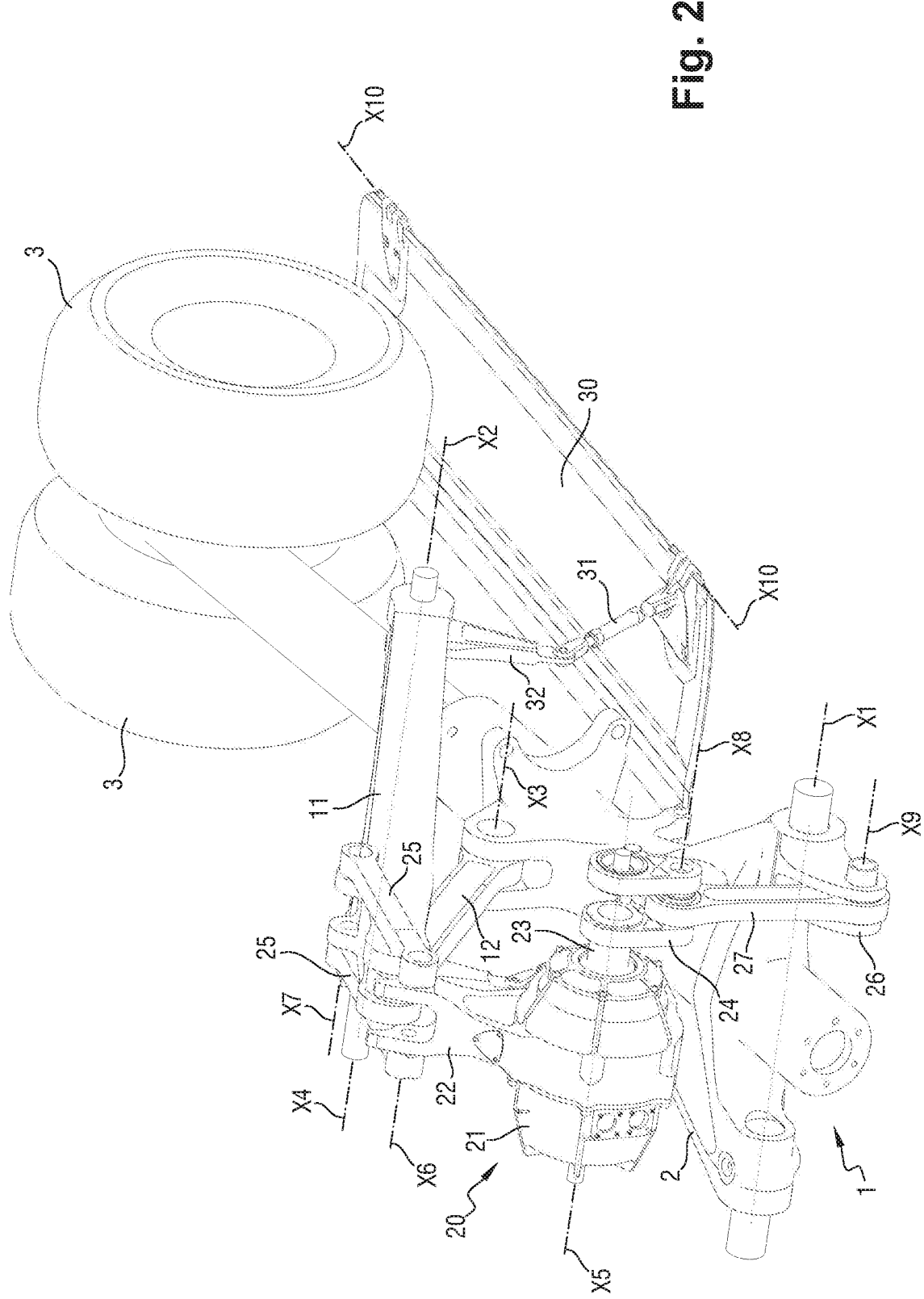

With reference to FIGS. 1 and 2, the invention in this example applies to an undercarriage 1 comprising a leg 2 carrying wheels 3 at its bottom end and hinged to a structure of an aircraft about a hinge axis X1 that is substantially horizontal in service. The leg is movable between a deployed position shown in FIG. 1 and a retracted position that can be seen in FIG. 2. The leg 2 is stabilized in the deployed position by means of a brace member 10 comprising two limbs that are hinged together, specifically a panel 11 hinged to the structure of the aircraft about a hinge axis X2 and an arm 12 hinged to the leg 2 and to the panel 11 about respective hinge axes X3 and X4. In the deployed position, the arm 12 and the panel 11 are in a substantially aligned position.

According to the invention, a rotary actuator 20 is provided that is free to rotate on the structure of the aircraft about an axis of rotation X5 that is parallel to the hinge axes X1 to X4. The rotary actuator comprises a casing 21 having an appendix that forms a first crank 22, and it includes a shaft 23 mounted to rotate about the axis of rotation X5 and carrying a second crank 24. The relative angular position between the two cranks 22 and 24 can be modified by powering the actuator so as to cause the shaft 23 to turn relative to the casing 21, and it can be fixed and held by means of the residual torque of the actuator 20 when it is not powered. In this example, the first crank 22 is coupled to the panel 11 of the brace member 10 by means of a first connecting rod 25 (in this example two connecting rods extending on either side of the end of the panel 11) hinged to the first crank 22 about a hinge axis X6 and hinged to the panel 11 about a hinge axis X7, while the second crank 24 is coupled to the leg 2, and more particularly to a horn 26 on the leg, by means of a second connecting rod 27 hinged to the second crank 24 about a hinge axis X8 and hinged to the horn 26 about a hinge axis X9. In this example, all of the axes X1 to X9 are mutually parallel.

Figure 3:
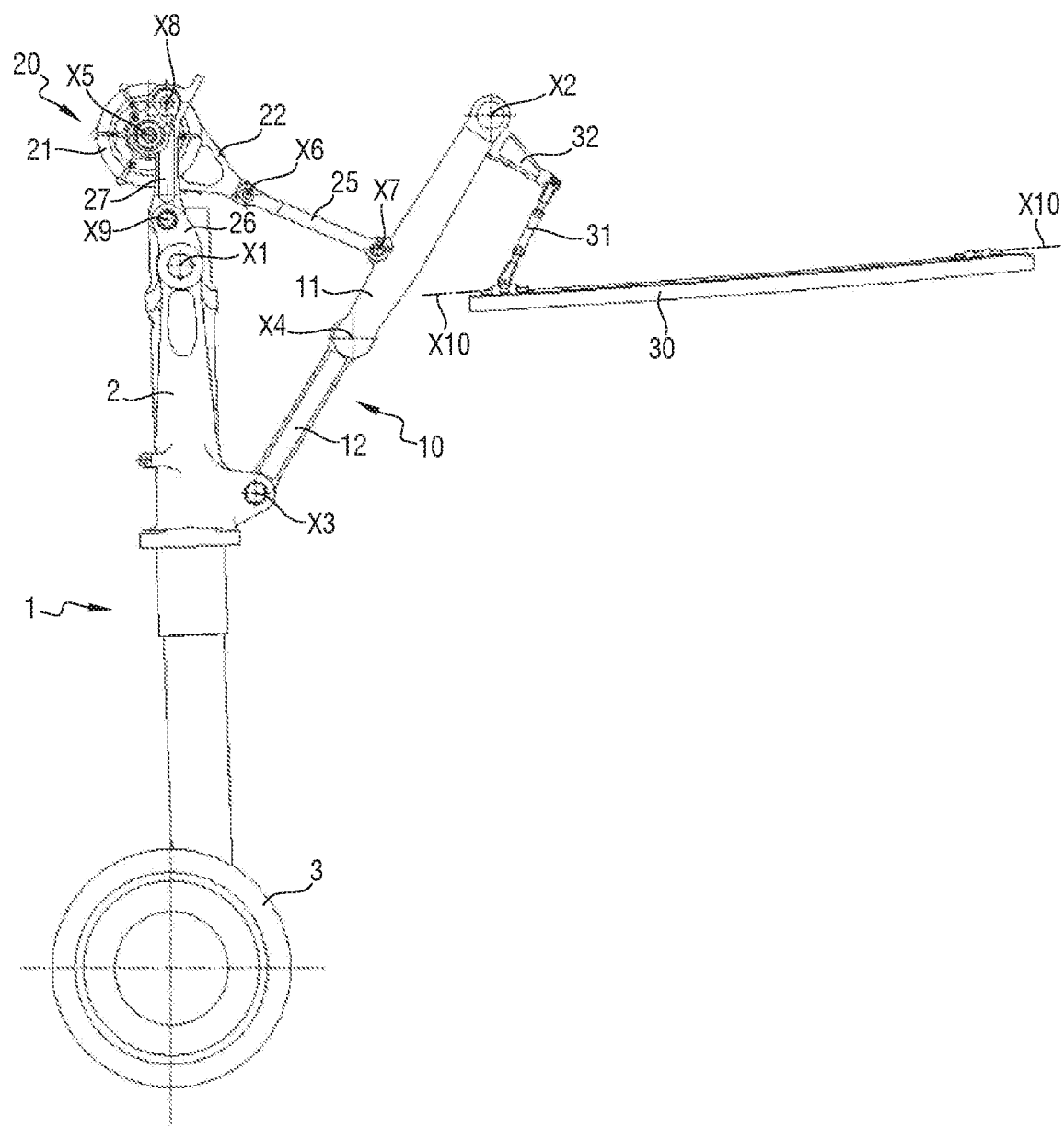
FIGS. 3 to 6 are side views of the FIG. 1 undercarriage, respectively in the deployed position, at the beginning of being raised, while it is being raised, and in the retracted position.
Figure 7:
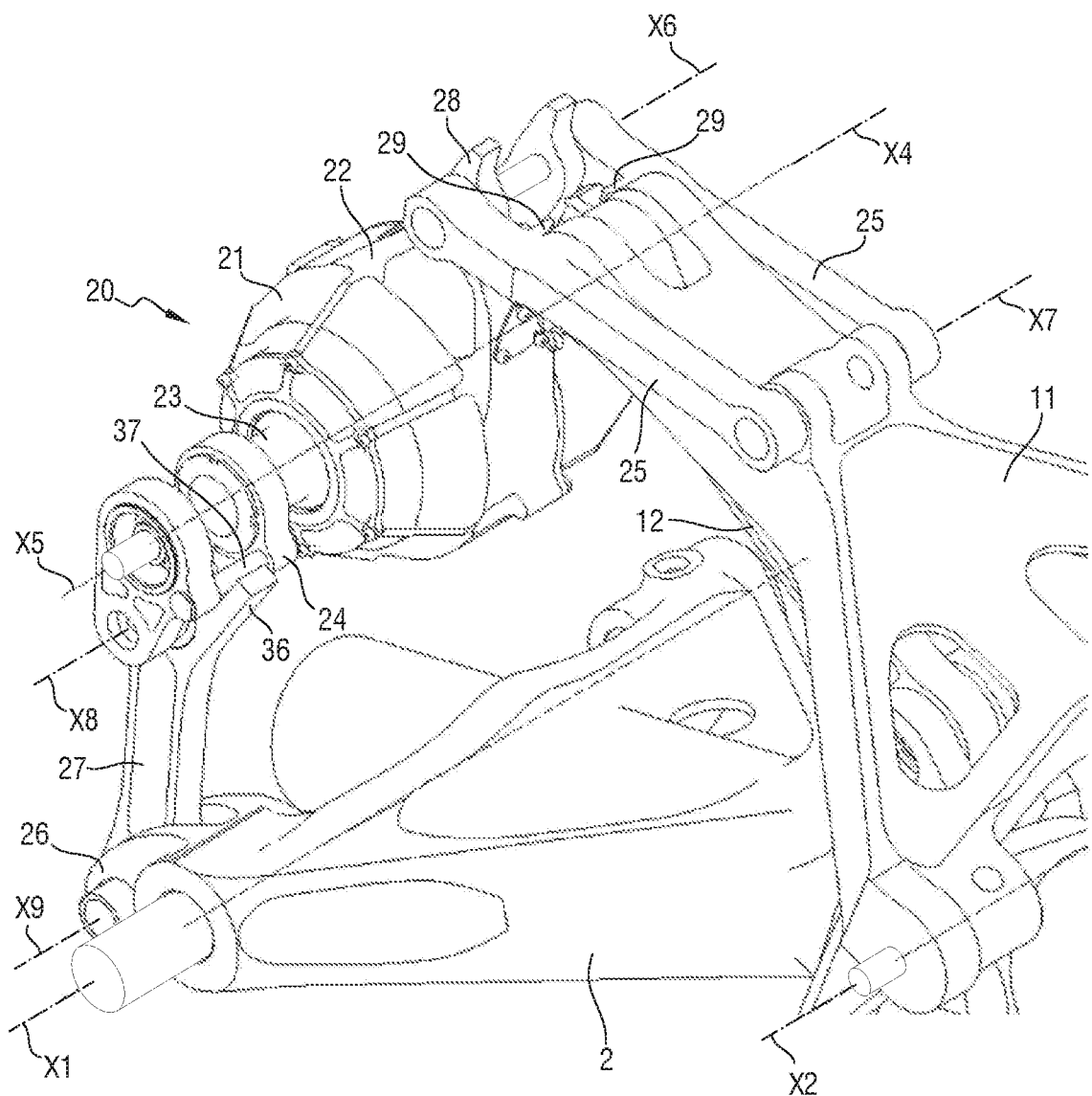
FIG. 7 is a perspective view of a detail showing the alignment between the crank and the associated connecting rod.

Such a configuration associates the relative angular position of the cranks 22 and 24 and the angular position of the leg 2 relative to the structure of the aircraft in one-to-one correspondence. In the position shown in FIG. 3, in which the leg 2 is in the deployed position, the relative angular position of the crank is such that the first crank 22 and the first connecting rod 25 are in a substantially aligned position, referred to as the first alignment. More precisely, the first alignment is a position obtained by causing the first crank 22 and the first connecting rod 25 to pass a little beyond their geometrically aligned position (as defined by the axes X5, X6, and X7 being in perfect alignment in a single plane) so as to cause them to reach respective abutments. As can be seen in FIG. 7, the abutment is in the form of fingers 28 extending from the end of the first crank so as to come to bear against obstacles 29 secured to the first connecting rod 25, which obstacles extend facing the fingers 28 and form a stop defining the first alignment. Likewise, the second connecting rod 27 has a finger 36 that comes to bear against an obstacle 37 secured to the second crank 24 (specifically a pin 36). In FIG. 7, the second crank 25 and the second connecting rod 27 are in the second alignment position, in which the finger 36 bears against the obstacle 37.

Returning to FIG. 3, it can be seen that the first crank 22 cannot turn since the actuator 20 is not powered, so its residual torque prevents the casing 21 and the shaft 23 from turning relative to each other, thereby constraining them together in rotation. However, the shaft 23 is blocked by the second crank 24, itself blocked against rotating by its coupling with the leg 2 via the second connecting rod 27, which is not in alignment with the second crank 24.

Figure 4:
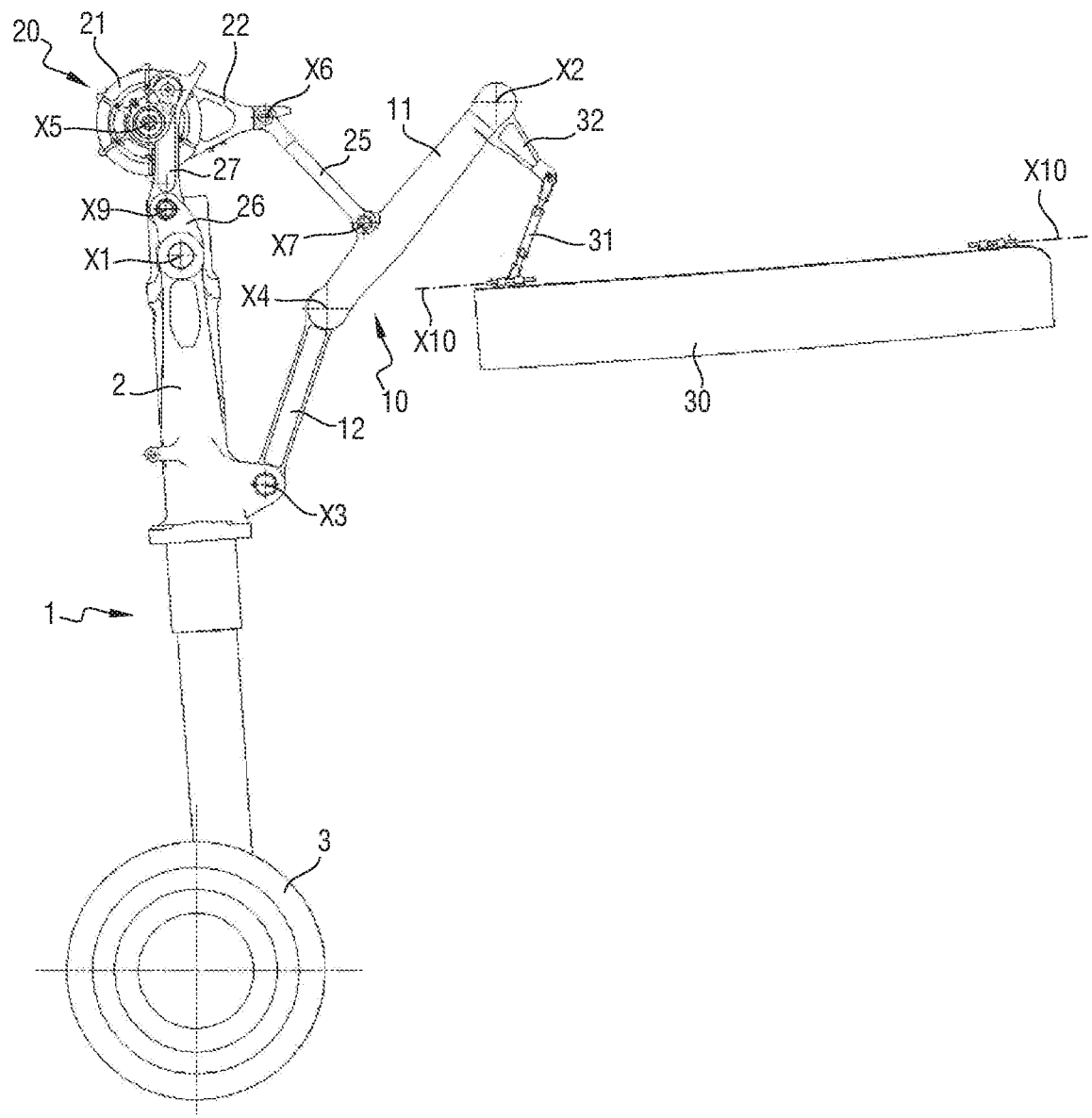
Figure 5:
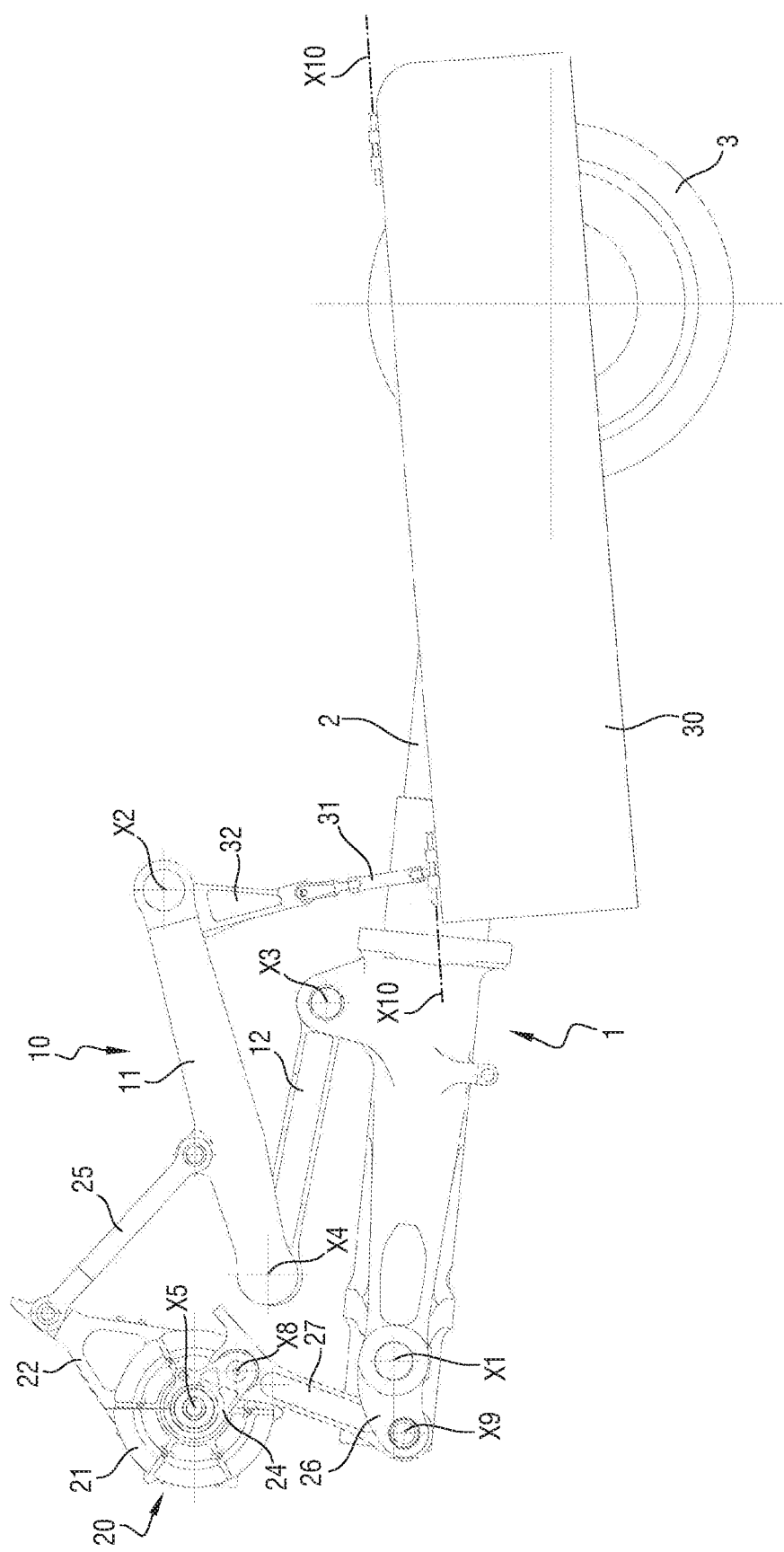
Figure 6:
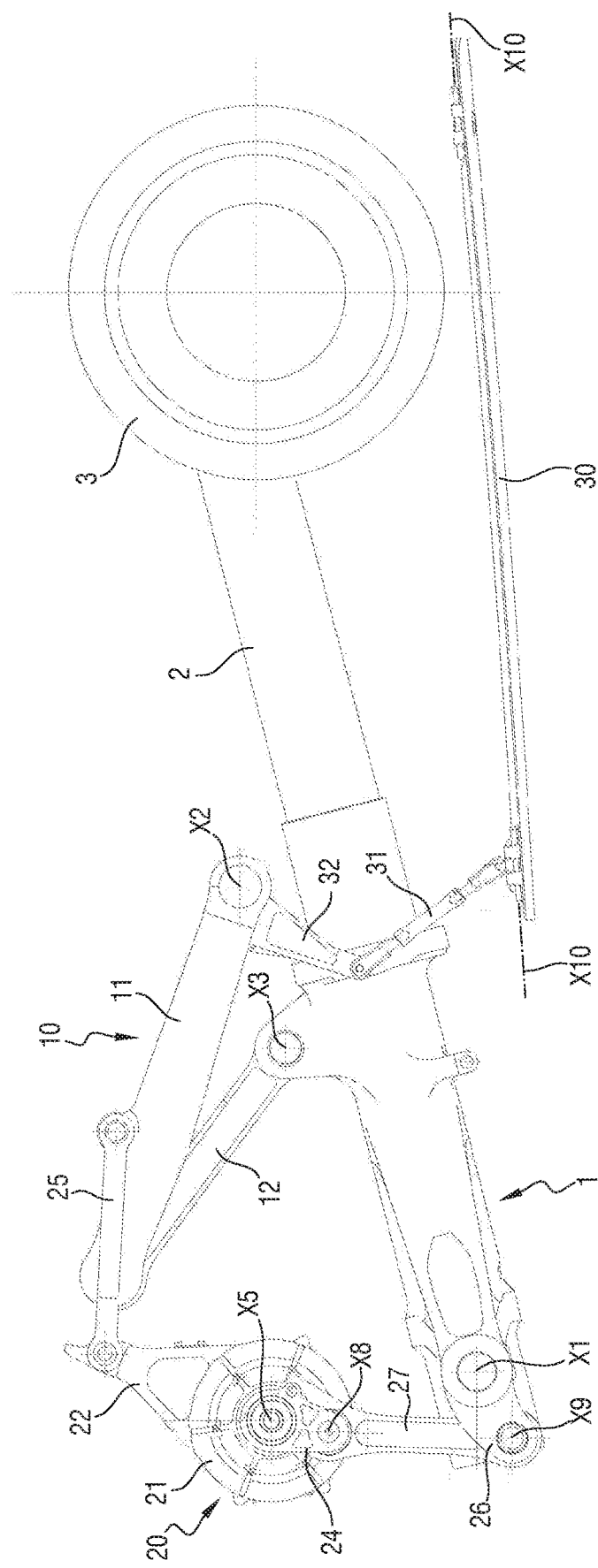

In order to raise the leg 2 towards the retracted position, the actuator 20 is powered so as to cause the shaft 23 to turn, thereby modifying the relative angular position between the cranks 22 and 24. As shown in FIG. 4, a first effect of this turning is to break the alignment between the first crank 22 and the first connecting rod 24, thereby breaking the alignment between the panel 11 and the arm 12 of the brace member 10. The undercarriage 2 is then no longer stabilized in its deployed position and the leg can be raised towards the retracted position. With the actuator 20 continuing to be powered, the leg 2 continues to rise, and it reaches an intermediate position as shown in FIG. 5 in which the first connecting rod 25 pulls on the panel 11, while the second connecting rod 27 pushes against the leg 2, thereby having the effect of raising the leg towards the retracted position as shown in FIG. 6, in which position the cranks are in a relative angular position such that the second crank 24 and the second connecting rod 27 reach a position in which they are substantially in alignment, referred to as the second alignment. In the same manner as for the first alignment, the second alignment is specifically a position that is obtained by causing the second crank 24 and the second connecting rod 27 to pass a little beyond the geometrical alignment (as defined by the axes X5, X8, and X9 being in perfect alignment in the same plane) so as to cause them to engage against respective abutments. This alignment blocks the leg 2 in the retracted position, such that this position is stable and does not require the use of an uplock box.

According to a particular aspect of the invention, the undercarriage has doors 30 coupled thereto, which doors 30 are hinged to the structure of the aircraft about axes X10 and that serve to close the well in which the undercarriage is housed when in the retracted position, with this being done by links 31 that are coupled directly to horns 32 projecting from the panel 11 of the brace member 10. In order to facilitate understanding of the invention, the figures do not show the fairing that is coupled to the leg and that co-operates with the two doors 30 to close the well when the undercarriage is in the retracted position, and that remains open when the undercarriage is in the deployed position. In both of the positions of the undercarriage that are shown in FIGS. 1, 2, 3, and 6, it can be seen that the doors 30 are in the closed position, even though they open while the undercarriage is being driven, as can be seen in FIGS. 4 and 5. Holding the doors in the closed position requires prestress to be installed on the doors 30 so as to be certain that they do not gape open in flight under the effect of aerodynamic forces. For this purpose, the links 31 are of a length that is determined so that both in the retracted position and also in the deployed position of the undercarriage, the doors 30 come to bear against an abutment 35 (visible in FIG. 1) that is secured to the structure of the aircraft a little before the connecting rod and crank assembly comes into alignment, and in particular a little before its preceding passage through the geometrically aligned position. The doors 30 coming up against the abutment 35 then make it necessary to pull on the links in order to prestress the doors 30, which then act as return springs confirming the crank-and-connecting rod assembly in its internal abutment position, and thus confirming that it is in alignment.

Figure 8:
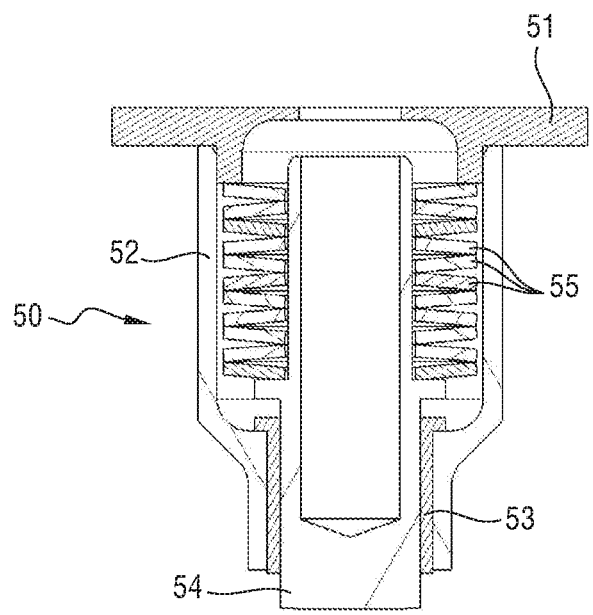
FIG. 8 is a section view of a resilient abutment mounted on the ceiling of the well to cooperate with the brace when the undercarriage is in the retracted position.

In order to add to the prestress induced by closing the doors, or in order to replace it if the doors are not coupled to the undercarriage, it is possible to use another external source of prestress, such as for example a resilient abutment 50, as shown in FIG. 8. The resilient abutment has a base 51 for fastening to the ceiling of the well. The base 51 carries a hollow cylinder or body 52 provided with a terminal opening carrying a guide 53. A piston 54 is slidably mounted in the guide 53 to project from the body 52. As shown in FIG. 8, the piston 54 is pushed towards a projecting position by Belleville spring washers 55 that are positioned inside the hollow body 52 and that exert prestress on the piston 54. In order to cause the piston 54 to retract, it is necessary to apply a force thereon that is not less than the prestress imparted by the Belleville washers 55.

Figure 9:
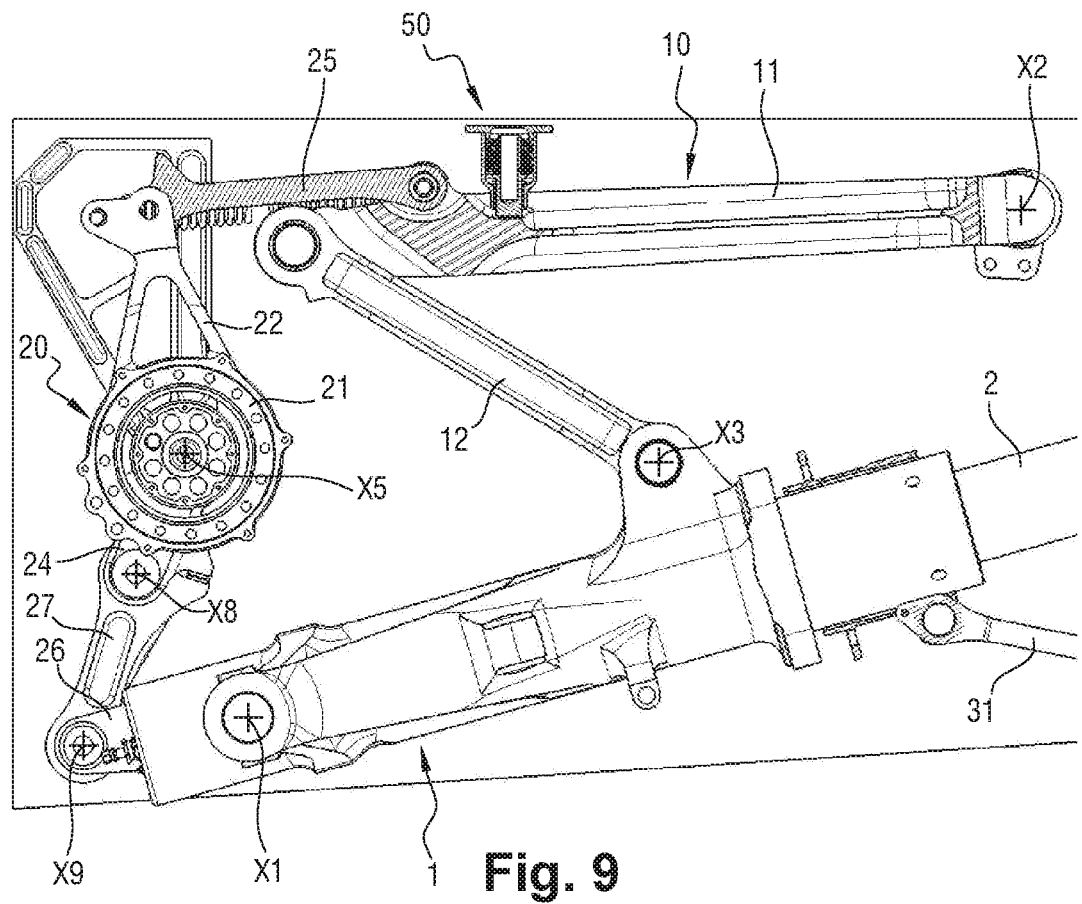
FIG. 9 is a side view of the undercarriage in the retracted position, the brace bearing against the resilient abutment.

As can be seen in FIG. 9, the resilient abutment 50 is positioned on the ceiling of the undercarriage well in such a manner that a portion of the brace member, specifically the brace panel 11, comes into abutment against the piston 54 when the undercarriage reaches the retracted position, before the second crank 24 and the second connecting rod 27 come into the geometrical alignment that precedes the "second alignment" position. Thus, in order to pass through the geometrical alignment and go beyond it so as to reach the second alignment, the brace panel 11 needs to push the piston 54 back against the prestress imparted by the Belleville washers 55. In this manner, the prestress from the Belleville washers is transmitted to the brace panel 11, in the same manner as the prestress from the doors is transmitted to the brace panel via the horns 32.

Naturally, the prestress from the doors and/or from the resilient abutment may be transmitted to a location on the undercarriage other than the brace panel, e.g. directly to the strut leg of the undercarriage. The prestress may also be exerted by one or more internal springs that confirm the second crank 24 and the second connecting rod 27 in their second alignment.

The invention is not limited to the above description, but on the contrary covers any variant coming within the ambit defined by the claims.

In particular, although the hinge axes in this example are all mutually parallel, the invention naturally applies to linkages with axes that are not parallel, providing each crank and connecting rod assembly of the actuator comes into alignment when the leg is in one or the other of its deployed and retracted positions.

The invention claimed is:

1. A method of driving an aircraft undercarriage between a deployed position and a retracted position, wherein the undercarriage comprises:
    a leg hinged to a structure of the aircraft configured to move between the deployed position and the retracted position, stabilized in the deployed position by a brace member comprising first and second limbs that are hinged to each other, the first limb coupled to the leg and the second limb coupled to the structure of the aircraft, the first and second limbs configured in an aligned position when the leg is in the deployed position;
    wherein the method comprises:
    rotating a rotary actuator is arranged on the aircraft, the actuator having first and second cranks mounted to turn freely about a common axis of rotation resulting in an angular position of the first and second cranks that can be controlled,
    the first crank being connected to the brace member by a first connecting rod,
    the second crank being connected to the leg by a second connecting rod, such that the first and second cranks comprise:
        a first angular position in which the first crank and the first connecting rod are brought into a first alignment when the leg is in the deployed position, thereby stabilizing the first and second limbs of the brace member in a substantially aligned position; and
        a second angular position in which the second crank and the second connecting rod are brought into a second alignment while the leg is in the retracted position, thereby stabilizing the leg in the retracted position.

2. The method according to claim 1, wherein the first alignment and the second alignment are defined by abutments between the first or second crank and the first or second connecting rod, respectively.

3. The method according to claim 1, wherein doors are coupled to the brace member, the doors configured to close a well in which the undercarriage is housed when in the retracted position, the doors being in the closed position when the undercarriage is in the deployed position and when the undercarriage is in the retracted position.

4. The method according to claim 3, wherein prestress is established on the doors when they doors are in the closed position so that the prestress causes the alignment of the first or second crank and first or second connecting rod respectively.

5. The method according to claim 1, wherein a resilient abutment is placed on the structure of the aircraft in such a manner that a portion of the undercarriage comes into contact against the resilient abutment and exerts prestress on the undercarriage causing the alignment of the second connecting rod and of the second crank when the undercarriage is in the retracted position.

6. The method according to claim 5, wherein the resilient abutment comprises a piston projecting from a body by action of Belleville washers imparting prestress on the piston, wherein a portion of the brace member is configured to bear against the piston when the undercarriage is in the retracted position.

* * * * *